United States Patent
Chen et al.

(10) Patent No.: US 10,187,784 B1
(45) Date of Patent: Jan. 22, 2019

(54) SYSTEMS AND METHODS FOR TRANSFERRING SIM PROFILES BETWEEN EUICC DEVICES

(71) Applicant: Verizon Patent and Licensing Inc., Arlington, VA (US)

(72) Inventors: Zhengfang Chen, Millburn, NJ (US); Musa Kazim Guven, Basking Ridge, NJ (US); Hakan Alparslan, Middletown, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 0 days.

(21) Appl. No.: 16/005,383

(22) Filed: Jun. 11, 2018

(51) Int. Cl.
*H04M 1/00* (2006.01)
*H04W 8/18* (2009.01)
*H04W 12/06* (2009.01)
*H04L 29/08* (2006.01)
*H04W 8/20* (2009.01)

(52) U.S. Cl.
CPC ........... *H04W 8/183* (2013.01); *H04L 67/306* (2013.01); *H04W 8/205* (2013.01); *H04W 12/06* (2013.01)

(58) Field of Classification Search
None
See application file for complete search history.

(56) References Cited

U.S. PATENT DOCUMENTS

| | | | |
|---|---|---|---|
| 2011/0314167 A1* | 12/2011 | King | H04L 67/14 709/228 |
| 2014/0088731 A1* | 3/2014 | Von Hauck | H04W 12/06 700/14 |
| 2016/0105540 A1* | 4/2016 | Kwon | H04N 21/41407 715/747 |
| 2017/0188230 A1* | 6/2017 | Danree | H04W 8/18 |

OTHER PUBLICATIONS

GSM Association, "Remote Provisioning Architecture for Embedded UICC Technical Specification," Official Document SGP.02, Version 3.1, May 2016.

* cited by examiner

*Primary Examiner* — Erika A Washington

(57) ABSTRACT

An embedded Universal Integrated Circuit Card ("eUICC") controller may transfer wireless network service between different User Equipment ("UE") by moving or exchanging one or more profiles between the eUICC of different UEs. The eUICC controller may directly access the eUICC of the UEs in order to control eUICC profile synchronization, disabling, downloading, and/or perform other eUICC management.

20 Claims, 9 Drawing Sheets

SYSTEMS AND METHODS FOR TRANSFERRING SIM PROFILES BETWEEN EUICC DEVICES

BACKGROUND

A physical Subscriber Identity Module ("SIM") card may store a profile that identifies and authenticates a subscriber for wireless network services (e.g., voice and/or data services). The subscriber can transfer the wireless network service by removing the physical SIM card from a first User Equipment ("UE"), and by inserting the physical SIM card into a second UE. The second UE may register and/or perform an activation procedure with the network upon powering on, using the profile from the inserted physical SIM card. After successful registration and/or activation, the second UE may access the wireless network service using the same unique identifier and account that were previously associated with the first UE. An embedded Universal Integrated Circuit Card ("eUICC") UE may include a programmable circuit that is embedded on the UE and that is used, instead of a physical SIM card, to store the subscriber profile.

DETAILED DESCRIPTION OF PREFERRED EMBODIMENTS

The following detailed description refers to the accompanying drawings. The same reference numbers in different drawings may identify the same or similar elements.

Systems and/or methods, as described herein, provide an embedded Universal Integrated Circuit Card ("eUICC") controller for transferring wireless network services (e.g., voice and/or data services) provided by a wireless telecommunications provider from one User Equipment ("UE") to another UE. The eUICC controller may transfer a subscriber or Subscriber Identity Module ("SIM") profile between the respective eUICCs of different UEs by directly accessing the eUICCs of the UEs, and controlling eUICC profile synchronization, disabling, downloading, and/or other eUICC management via the eUICC direct access.

Figure 1:
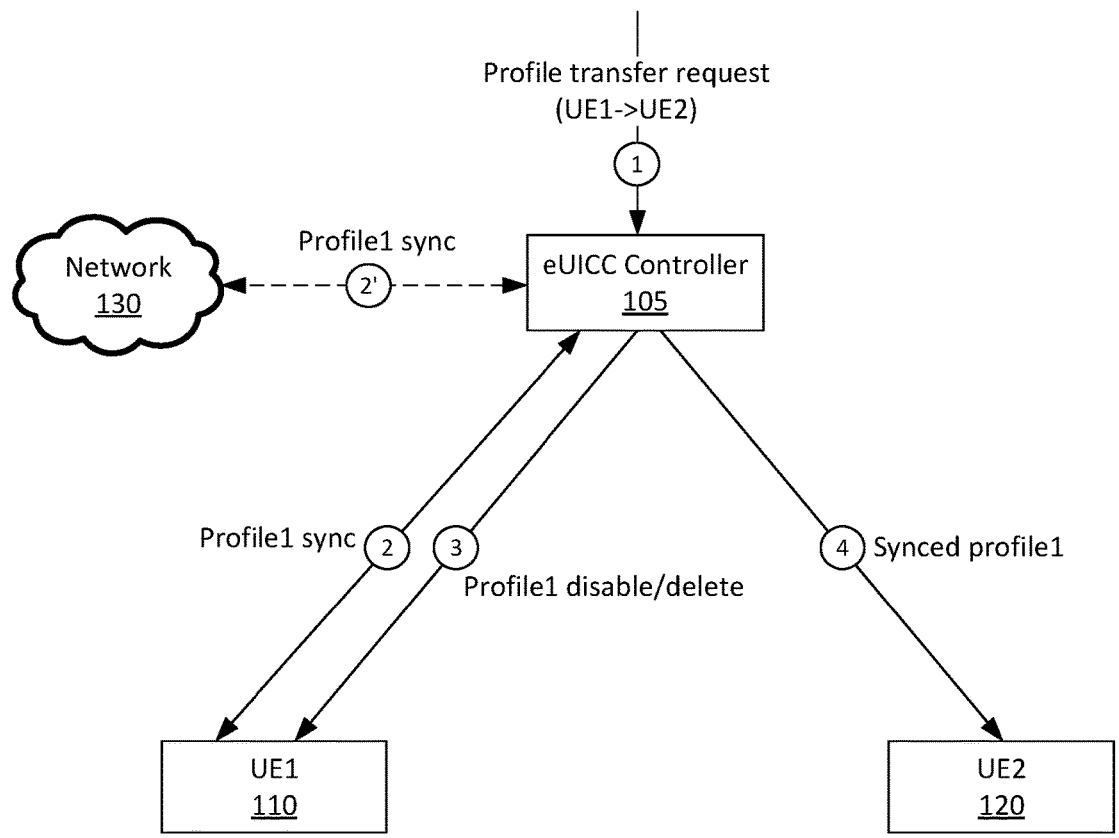
FIG. 1 illustrates an example of an embedded Universal Integrated Circuit Card ("eUICC") controller moving a profile from the eUICC of a first User Equipment ("UE") to the eUICC of a second UE according to an implementation described herein.

FIG. 1 illustrates an example of eUICC controller 105 moving a profile from the eUICC of first UE 110 to the eUICC of second UE 120 according to an implementation described herein. In this example, the profile may authorize first UE 110 to access one or more wireless network services from wireless telecommunications network 130 via a particular unique identifier and a particular account that are associated with the profile. The particular unique identifier may be one or more of the telephone number, International Mobile Subscriber Identity ("IMSI"), or other number (e.g., hash or other function output based on the telephone number) associated with first UE 110 or a subscriber that may be linked to first UE 110.

eUICC controller 105 may receive (at 1) a request to move the profile stored on the eUICC of first UE 110 to the eUICC of second UE 120. As described herein, the profile transfer request may be initiated by first UE 110, second UE 120, network 130, and/or by another device or system.

eUICC controller 105 may synchronize (at 2) a profile, that is locally stored at eUICC controller 105, with a profile that is stored by the eUICC of first UE 110 in response to the request. The profile synchronization may include obtaining a complete copy or a subset of the profile that is stored by the eUICC of first UE 110. To initiate the profile synchronization, eUICC controller 105 may issue a profile synchronization request to the eUICC of first UE 110. In response to the profile synchronization request, the eUICC of first UE 100 may read out one or more parameters of profile stored by the eUICC, and return the read parameters to eUICC controller 105 via a wireless network.

In some embodiments, the profile may include parameters associated with one or more of a file structure, data, and applications that are provisioned onto, or presented on, the eUICC of first UE 110. The parameters may be initially programmed into the eUICC of first UE 110 based on a base profile. One or more of the parameters may be subsequently programmed with custom values by network 130 as part of registering first UE 110 for the wireless network service provided by network 130. For instance, the custom values programmed by network 130 may include a telephone number (e.g., Mobile Directory Number ("MDN") or Mobile Station International Subscriber Directory Number ("MSISDN")), a preferred Public Land Mobile Network ("PLMN") roaming list of network 130, an applets configuration, a Network Selection Activation Flag, and/or other custom network or service data.

In some embodiments, eUICC controller 105 may obtain (at 2') the base profile from a subscription management device of network 130. For instance, the base profile may be stored in a Subscription Manager-Data Preparation ("SM-DP") server of network 130. Synchronizing the subset of customized parameters may involve reading and transferring less data from the eUICC of first UE 110 (e.g., reading and transferring the subset of customized parameters) than when reading and transferring the complete profile from the eUICC of first UE 110 (e.g., reading and transferring the subset of customized parameters as well as any static or unchanged parameters from the base profile). That is, in some such embodiments, eUICC controller 105 may obtain (at 2') the base profile from network 130, may obtain (at 2) values for the subset of customized parameters from the eUICC of first UE 110, and may aggregate the base profile and the values for the customized parameters to reconstruct the full profile stored by the eUICC of first UE 110.

Once eUICC controller 105 has received and/or reconstructed the profile associated with first UE 110, eUICC controller 105 may issue (at 3) a profile disable and/or delete command to first UE 110. In response to the issued (at 3) command, first UE 110 may disable and/or delete the profile from the eUICC of first UE 110. Once the profile is disabled or deleted, first UE 110 may lose access to the wireless network service provided by network 130 via the particular unique identifier and particular account associated with the disabled or deleted profile.

eUICC controller 105 may provide (at 4) the profile that was synchronized (at 2 and/or 2') from the eUICC of first UE 110 to the eUICC of second UE 120. eUICC controller 105 may provide (at 4) the synchronized profile to second UE 120 via wireless network service provided by network 130 when second UE 120 has an existing profile that authorizes second UE 120 to access wireless network service from network 130. eUICC controller 105 may also provide (at 4) the synchronized profile to second UE 120 via an alternate network when the second UE 120 does not have an existing profile with which to access wireless network service from network 130. For instance, eUICC controller 105 may provide (at 4) the synchronized profile to second UE 120 when second UE 120 is connected to a WiFi network, or when the eUICC of second UE 120 stores a profile that authorizes second UE 120 to access wireless network service from the same or different wireless telecommunications network (e.g., a network other than network 130).

Second UE 120 may perform an activation procedure with network 130 using the information from the provided profile. After successfully completing the activation procedure, second UE 120 may use the profile to access one or more wireless network services provided by network 130 via the same parameters from the profile obtained from first UE 110 (e.g., the same particular unique identifier, the same particular account, etc., that were previously associated with first UE 110).

Figure 2:
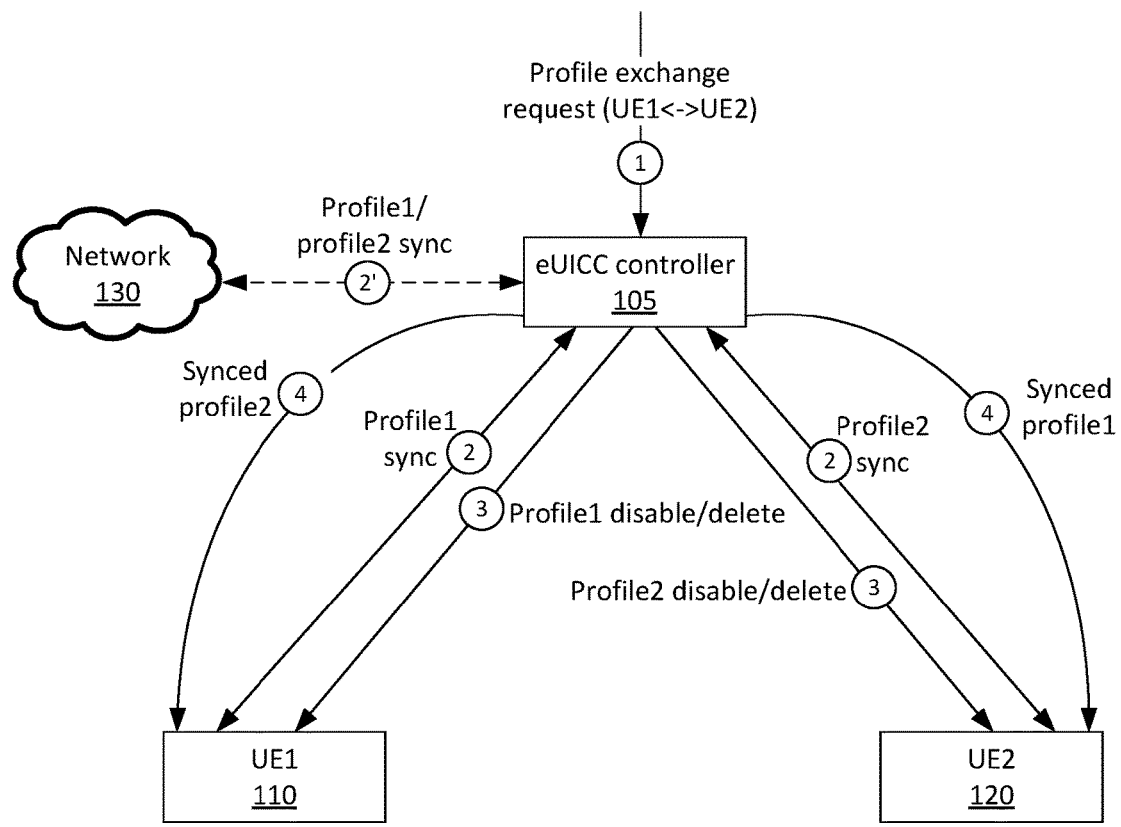
FIG. 2 illustrates an example of the eUICC controller exchanging profiles between a first UE and a second UE according to an implementation described herein.

FIG. 2 illustrates an example of eUICC controller 105 exchanging profiles between first UE 110 and second UE 120 according to an implementation described herein. The profile exchange may be initiated in response to eUICC controller 105 receiving (at 1) a request for swapping the profiles on the eUICCs of first UE 110 and second UE 120. The request may identify first UE 110 and second UE 120.

A profile exchange, instead of the profile move illustrated by FIG. 1, may be requested when swapping wireless network service between two UEs. For instance, family members (e.g., user 1 and user 2) may swap smart phones, tablet computers, and/or other types of devices. A first UE 110 may have an eUICC that stores a first profile, and a second UE 120 may have an eUICC that stores a second profile. The first profile may be associated with an account of user 1, and wireless network services that user 1 is authorized to access from network 130. The second profile may be associated with a different account of user 2, and different wireless network services that user 2 is authorized to access from network 130. In response to the request for swapping wireless network service, eUICC controller 105 may perform the profile swap between first UE 110 and second UE 120 to coincide with the physical swapping of UEs between user 1 and user 2 (e.g., first UE 110 to user 2 and second UE 120 to user 1). After completion of the profile exchange, second UE 120, now carried by user 1, may access the wireless network services that are associated with user 1's account and unique identifier, and first UE 110, now carried by user 2, may access the wireless network services associated with user 2's account and unique identifier.

eUICC controller 105 may perform (at 2) a profile synchronization with first UE 110 and second UE 120 in response to the profile exchange request. In some embodiments, the profile synchronization may include reading and transferring the complete profile from the eUICC of each UE (e.g., first UE 110 and second 120). In some embodiments, the profile synchronization may include obtaining (at 2') a base profile for each UE (e.g., first UE 110 and second UE 120) from network 130, and synchronizing the base profiles with the subset of customized parameters from the eUICC stored profiles (e.g., as similarly described above with respect to FIG. 1).

eUICC controller 105 may issue (at 3) a profile disable and/or delete command to first UE 110 and second UE 120. Each UE may disable and/or delete the existing profile stored by the eUICC of the respective UE in response to the command. Disabling and/or deleting the existing profile may cause each UE to temporarily lose access to the wireless network service provided by network 130, or to have limited access to network 130 for profile provisioning purposes or emergency related services. eUICC controller 105 may provide (at 4) the profile synchronized from the eUICC of first UE 110 to the eUICC of second UE 120, and may provide (at 4) the profile synchronized from the eUICC of second UE 120 to the eUICC of first UE 110. eUICC controller 105 may provide (at 4) the synchronized profiles over a WiFi connection, wireless connectivity provided by a different network other than network 130, or the limited access to network 130 for profile provisioning purposes.

First UE 110 and second UE 120 may perform an activation procedure with network 130 (e.g., to activate the received respective profiles). Completion of the activation procedure may conclude the profile exchange. As a result of the profile exchange, first UE 110 may access a first set of wireless network services provided by network 130 using a first number and a first account that were previously associated with second UE 120, and second UE 120 may access a second set of wireless network services provided by network 130 using a second number and a second account that were previously associated with first UE 110. The profile exchange allows users to move their numbers and wireless network service to different UEs without physically modifying the UEs and with minimal user interaction. Consequently, users can easily trade, change, and upgrade UEs.

Figure 3:
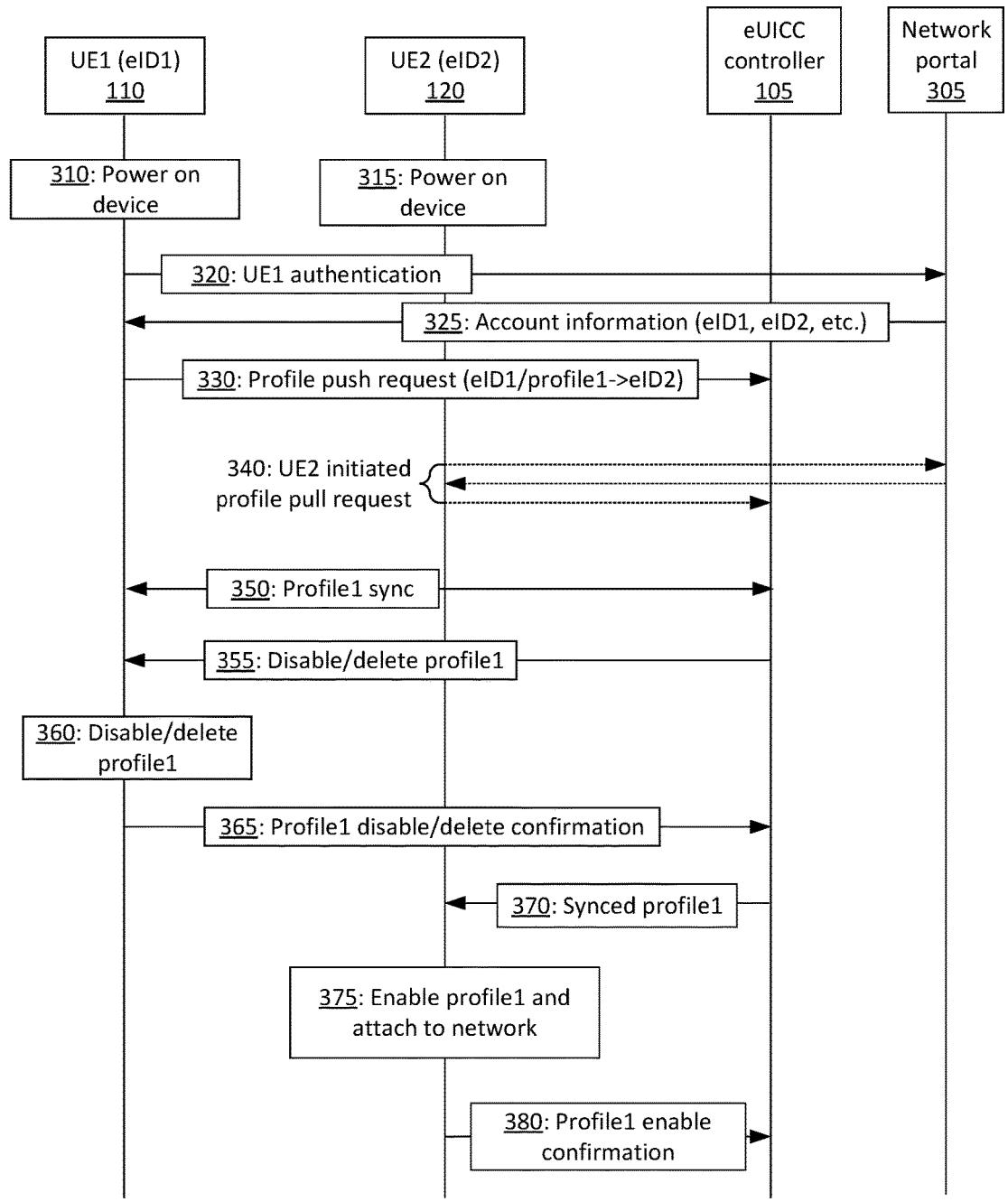
FIG. 3 illustrates an example of a UE-initiated profile transfer.

FIG. 3 illustrates an example of a UE-initiated profile transfer. In this example, a profile is transferred from the eUICC of first UE 110 to the eUICC of second UE 120. As shown, first UE 110 may power (at 310) on, and attach to one or more available wireless networks using one or more wireless radios of first UE 110. Similarly, second UE 120 may power (at 315) on, and attach to one or more available wireless networks using one or more wireless radios of second UE 120. For instance, first UE 110 and second UE 120 may connect to a Radio Access Network ("RAN") of network 130, a RAN of a different wireless telecommunications network, a WiFi network, or other network.

First UE 110 may perform (at 320) an authentication procedure with network portal 305. Performing the authentication procedure may include providing a username and password, or successfully performing some other identity authentication or verification procedure with network portal 305, via an application or website running on a browser of first UE 110.

Upon successful authentication, network portal 305 may provide (at 325) account information to first UE 110. The account information may list subscriber UEs that can be used, when activated via a valid profile, to access wireless network service from network 130. The subscriber UEs may be identified by their eUICC-identifier ("eID"), International Mobile Equipment Identity ("IMEI"), device name/type, and/or another identifier associated with each UE. Network portal 305 may obtain the account information from a Home Subscriber Server ("HSS") of network 130 and/or from some other device and/or system.

In some embodiments, the subscriber and/or an administrator (e.g., an administrator associated with network portal 305) may manage the account by adding or removing UEs from the account. For instance, the subscriber may add first UE 110 and second UE 120 to the account by providing the eID, telephone number, IMEI, and/or another unique identifier associated with each UE. The subscriber may also verify access to or possession of a UE before the UE can be added to the account. In some embodiments, information may be automatically populated to a subscriber account from each of the subscriber's UE during registration, activation, or other network access by each subscriber UE. An application programming interface ("API") or application running on the subscriber UE may communicate with the profile or other components of the UE in order to obtain and provide the identifying information. Similarly, network portal 305 may query and obtain the identifying information from a UE when that UE is used to access the account. Network portal 305 may also generate some of identifying information based on a hash or other processing of the account information (e.g., a hash of MDN, IMEI, etc.).

The subscriber may also request various services via the account (e.g., via network portal 305). For instance, the subscriber may initiate a profile transfer request identifying first UE 110, as a source UE that is currently provisioned with a target profile for accessing wireless network service from network 130, and second UE 120 as a destination UE for receiving the target profile and transfer of wireless network service from the source UE.

The profile transfer request may include identifying information (e.g., one or more of a first telephone number, first IMEI, or first eID) associated with first UE 110 to identify first UE 110 as the source UE, and may also include identifying information associated with second UE 120 to identify second UE 120 as the destination UE for the profile transfer. In some embodiments, eUICC controller 105 may determine the eIDs for the source UE and destination UE when the identifying information provides one or more of the UE telephone numbers or IMEIs. eUICC controller 105 may use the eIDs to access and/or communicate with the eUICCs of first UE 110 and second UE 120 during remote eUICC provisioning. The eID may include the Security Domain Provider Identification Number ("SIN") and the Security Domain Image Number ("SDIN"), the combination of which is unique for each eUICC or each UE.

In some embodiments, the profile transfer request may also include an Integrated Circuit Card Identifier ("ICCID"). Each stored profile may be identified by a unique ICCID. Accordingly, the ICCID included with the profile transfer request may identify a particular profile (from one or more stored profiles) to transfer from the eUICC of first UE 110.

First UE 110 may issue (at 330) the profile transfer request to eUICC controller 105. In some embodiments, first UE 110 may directly issue the request to eUICC controller 105. In some other embodiments, first UE 110 may issue the request to network portal 305, and network portal 305 may route or otherwise provide the request to eUICC controller 105.

The profile transfer request initiated by first UE 110 may be considered a "push" profile transfer request because first UE 110 is requesting that an existing profile on the eUICC of first UE 110 be pushed to the eUICC of second UE 120. In some embodiments, second UE 120 may initiate (at 340) a pull profile transfer request to request that an existing profile on the eUICC of first UE 110 be pulled to the eUICC of second UE 120. To initiate (at 340) the pull profile transfer request, second UE 120 may perform an authentication procedure with network portal 305, obtain account information, and issue a transfer request based on the obtained account information (e.g., as similarly discussed above with respect to blocks 320 and 325).

In response to a request, initiated either by first UE 110 or second UE 120, for transferring a profile from the eUICC of first UE 110 to the eUICC of second UE 120, eUICC controller 105 may synchronize (at 350) a profile that is locally stored at the eUICC controller 105 with the target profile that is stored to the eUICC of first UE 110. The profile synchronization may include eUICC controller 105 issuing a profile synchronization request to the eUICC of first UE 110. The profile synchronization request may specify an upload command and the ICCID for a specific target profile from several profiles that are stored to the eUICC of first UE 110. First UE 110 may read, from the eUICC, the target profile associated with the ICCID, and may provide the read contents from the target profile to eUICC controller 105 in response to the profile synchronization request.

The profile contents obtained by eUICC controller 105, as a result of performing (at 350) the profile synchronization, may include one or more of the IMSI, security authentication and ciphering information, a list of authorized wireless network services, a Mobile Network Operator Security Domain ("MNO-SD"), at least one Network Access Application ("NAA"), policy rules within the profile ("POL1"), a Universal SIM ("uSIM") application, a Code-Division Multiple Access SIM ("cSIM") application, an Internet Protocol Multimedia SIM ("iSIM") application, a Controlling Authority Security Domain ("CASD"), a PLMN roaming list, contact information, MNO Over-The-Air ("OTA") key sets, and/or other information. The MNO-SD may provide a secured channel for managing content of the SIM profile. The NAA may be an application on the SIM profile for authorizing access to a network. The POL1 may specify different actions and conditions for executing the actions. The uSIM, cSIM, and iSIM applications may contain different files (e.g., master files, dedicated files, elementary files, or other file types). The files may provide specific parameters for communication or access via a Universal Mobile Telecommunications System ("UMTS"), High Speed Packet Access ("HSPA"), Long Term Evolution ("LTE"), Code Division Multiple Access ("CDMA"), and/or other network technologies that may be used by network 130. For instance, the files may be used to identify and authenticate the subscriber or UE, identify authorized services or access, and secure OTA communications (e.g., encrypting OTA communications via one or more encryption keys or the MNO OTA key sets) when communicating using the different network technologies (e.g., UMTS, HSPA, LTE, CDMA, etc.).

eUICC controller 105 may issue (at 355) a disable and/or delete command to first UE 110 after completing the profile synchronization and obtaining the profile contents. The disable and/or delete command may specify the eID of first UE 110 and/or the ICCID of the synchronized profile. In some embodiments, issuing (at 355) the disable and/or delete command may include calling one or more of the "ES2.DisableProfile", "ES4.DisableProfile", "ES2.DeleteProfile", or "ES4.DeleteProfile" functions specified in "Remote Provisioning Architecture for Embedded UICC Technical Specification", Global System for Mobile Association, Version 3.1, May 27, 2016 (hereinafter referred to as "GSMA eUICC Specification").

First UE 110 may disable (at 360) and/or delete the synchronized profile from the eUICC in response to the issued (at 355) command. Consequently, first UE 110 may lose wireless network service from network 130. However, first UE 110 may obtain wireless network service from an alternate network including an available WiFi network or a different wireless telecommunications network that is associated with a provisioning profile stored to the eUICC of first UE 110. The eUICC of first UE 110 may also store a provisioning profile that grants limited access to network 130 for profile provisioning purposes or emergency related services. The provisioning profile may be a different profile than the synchronized and disabled or deleted target profile.

First UE 110 may issue (at 365) a confirmation message to eUICC controller 105, indicating that the synchronized profile has been disabled and/or deleted. eUICC controller 105 may provide (at 370) the synchronized profile to second UE 120 using one or more of an Internet Protocol ("IP") address, telephone number, eID, or other identifier used by second UE 120 to communicate over a connected network. eUICC controller 105 may provide the synchronized profile to second UE after eUICC controller 105 receives the disable and/or delete confirmation from first UE 110 so as to ensure that the same profile is not simultaneously active on two different UEs.

In some embodiments, downloading (at 370) the synchronized profile may include eUICC controller 105 issuing a download command to second UE 120 using one or more of the IP address, eID, telephone number, or other identifier associated with second UE 120. The download command may provide the ICCID for the synchronized profile and/or contents of the synchronized profile. In some embodiments, issuing (at 370) the download command may include calling one or more of the "ES2.DownloadProfile", "ES3.SendData", "ES3.UpdateConnectivityParameters", "ES3.UpdatePolicyRules", and "ES3.UpdateSubscriptionAccess" functions specified in the GSMA eUICC Specification.

Second UE 120 may receive the synchronized profile from eUICC controller 105. Second UE 120 may write the synchronized profile to its eUICC, enable (at 375) the profile, and perform an activation procedure with network 130 based on the enabled (at 375) profile. If activation is successful, second UE 120 may access wireless network services provided by network 130 according to the parameters of the profile using the same account that was associated with first UE 110 prior to the profile being transferred. Second UE 120 may signal successful activation by providing (at 380) a profile enable confirmation message to eUICC controller 105.

In response to a profile enable confirmation message, eUICC controller 105 may update network 130 regarding the transferred profile. For instance, eUICC controller 105 may message the SM-DP server, and/or some other device or system, of network 130 that the profile that was previously associated with first UE 110 has been transferred to second UE 120 and is used by second UE 120 for service access.

Figure 4:
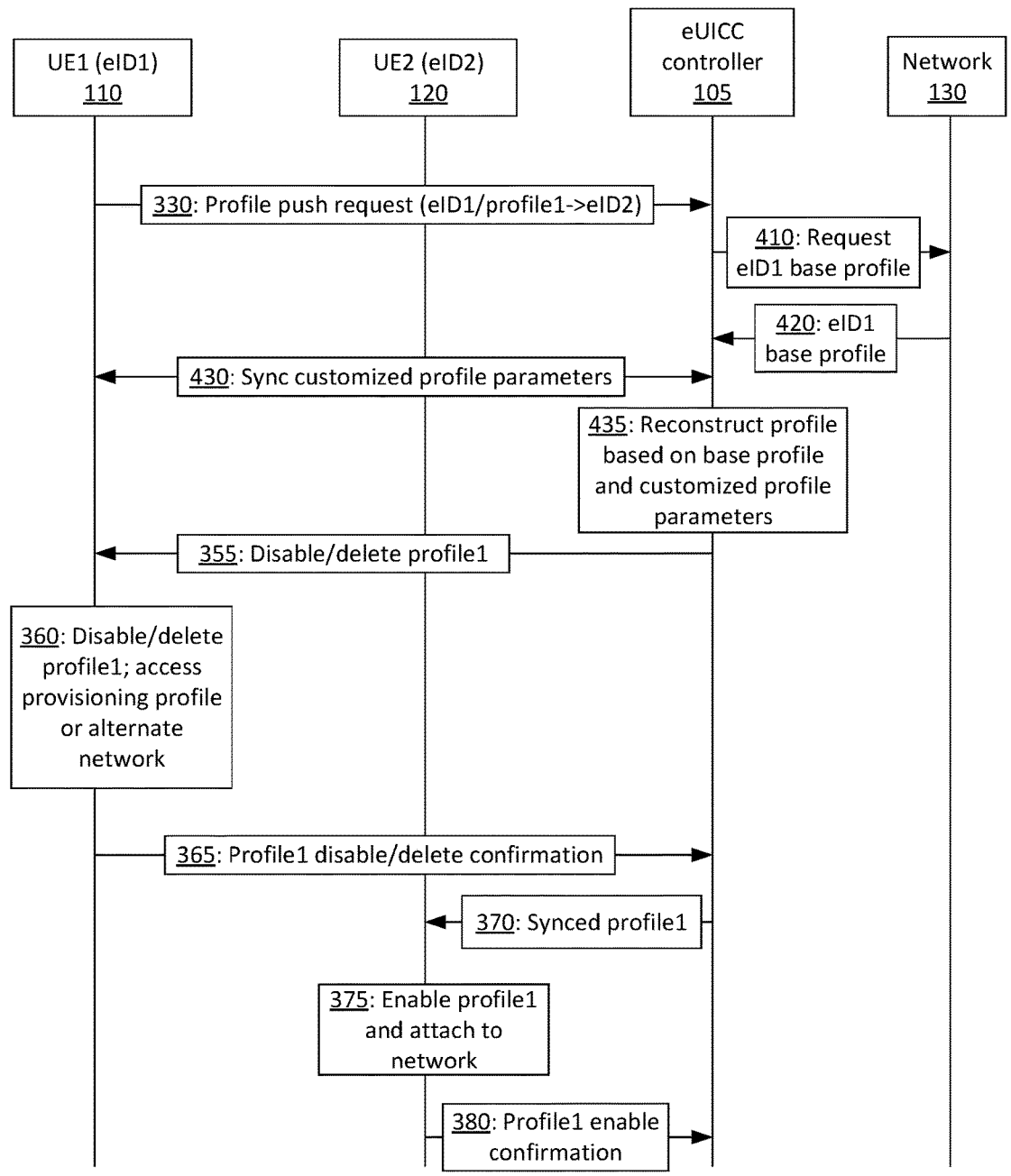
FIG. 4 illustrates the eUICC controller transferring a profile according to a base profile and synchronization of a subset of the profile stored to the eUICC of a first UE.

FIG. 4 illustrates eUICC controller 105 transferring a profile from first UE 110 to second UE 120 according to a base profile obtained from network 130 and synchronization of a subset of the profile stored to the eUICC of first UE 110. FIG. 4 assumes that first UE 110 and second UE 120 have been powered on and are connected to at least one network. The process shown in FIG. 4 may be similar to the one shown in FIG. 3, with the exception that the profile of first UE 110 is reconstructed from a base profile as well as custom parameters associated with the profile stored by the eUICC of first UE 110.

First UE 110 may issue (at 330) a profile push request to eUICC controller 105. In response to the profile push request, eUICC controller 105 may request (at 410) and obtain (at 420) from network 130, a base profile for the profile identified in the profile push request. For instance, eUICC controller 105 may query the SM-DP server of network 130 for the base profile that was initially provisioned to the telephone number, ICCID, eID, or other unique identifier associated with first UE 110 and/or the target profile.

The base profile may include the file structure, data, and applications that were initially downloaded to the eUICC of first UE 110 prior to first UE 110 completing an activation procedure with network 130. At the conclusion of the activation procedure, network 130 may customize a subset of the profile parameters stored to the eUICC of first UE 110, thereby changing the profile that may be stored on the eUICC from the base profile that was initially downloaded to the eUICC. For example, the network 130 may customize one or more USIM files, CSIM files, ISIM files, applet configurations, and/or other network service access parameters that are specific to first UE 110 or network services that first UE 110 is authorized to access. The telephone number (e.g., MDN or MSISDN) and PLMN roaming list are two specific examples of profile parameters that network 130 may customize during the activation procedure.

eUICC controller 105 may access the eUICC of first UE 110 in order to synchronize (at 430) a subset of the profile stored thereon. In this example, the synchronization (at 430) may include obtaining values for a specific subset of customized parameters from the profile stored by the eUICC of first UE 110. In some embodiments, network 130 may modify values of the specific subset of customized parameters as part of or during profile activation, registration, or service access. eUICC controller 105 may directly read the customized parameters from the eUICC of first UE 110 by accessing the eUICC of first UE 110. eUICC controller 105 may also issue a command to first UE 110 or the eUICC of first UE 110. The command may identify the customized parameters, and first UE 110 may respond to the command by providing values for the identified customized parameters to eUICC controller 105. In some embodiments, eUICC controller 105 tracks which parameters of the profile are customized by network 130 via communication with network 130. For instance, eUICC controller 105 may determine which parameters are customized by network 130 based on communications with the HSS, SM-DP server, or other profile activation or registration server of network 130. In some embodiments, first UE 110 may track which parameters of the profile stored by the eUICC of first UE 110 are customized by network 130. In some such embodiments, eUICC controller 105 may issue a command for customized parameters. First UE 110 may respond to the command by providing the tracked parameters that have been customized by network 130.

eUICC controller 105 may reconstruct (at 435) the profile of first UE 110 by updating the base profile received (at 420) from network 130 with the subset of customized parameters that were obtained (at 430) from the profile stored to the eUICC of first UE 110. In this manner, the updated base profile locally stored at the eUICC controller 105 may be synchronized with and match the profile stored to the eUICC of first UE 110.

Reading from the eUICC may be a slow operation. By reducing the amount of data that is read from the eUICC, via synchronizing a subset of parameters from the stored profile rather than the entire profile, eUICC controller 105 may reduce the time to complete the synchronization (at 430).

eUICC controller 105 may issue (at 355) a disable and/or delete command to first UE 110 after successfully synchronizing the customized profile parameters. First UE 110 may disable (at 360) and/or delete the synchronized profile from the eUICC in response to the issued (at 355) command. First UE 110 may issue (at 365) to eUICC controller 105, confirmation that the synchronized profile has been disabled and/or deleted.

eUICC controller 105 may transfer the synchronized profile (e.g., the updated base profile) to second UE 120 by downloading (at 370) the synchronized profile to the eUICC of second UE 120. Second UE 120 may write the synchronized profile to its eUICC, enable (at 375) the profile, and perform an activation procedure with network 130 based on the enabled (at 375) profile. Successful activation may provide second UE 120 with access to different wireless network services provided by network 130. Second UE 120 may signal successful activation by providing (at 380) a profile enable confirmation message to eUICC controller 105.

Figure 5:
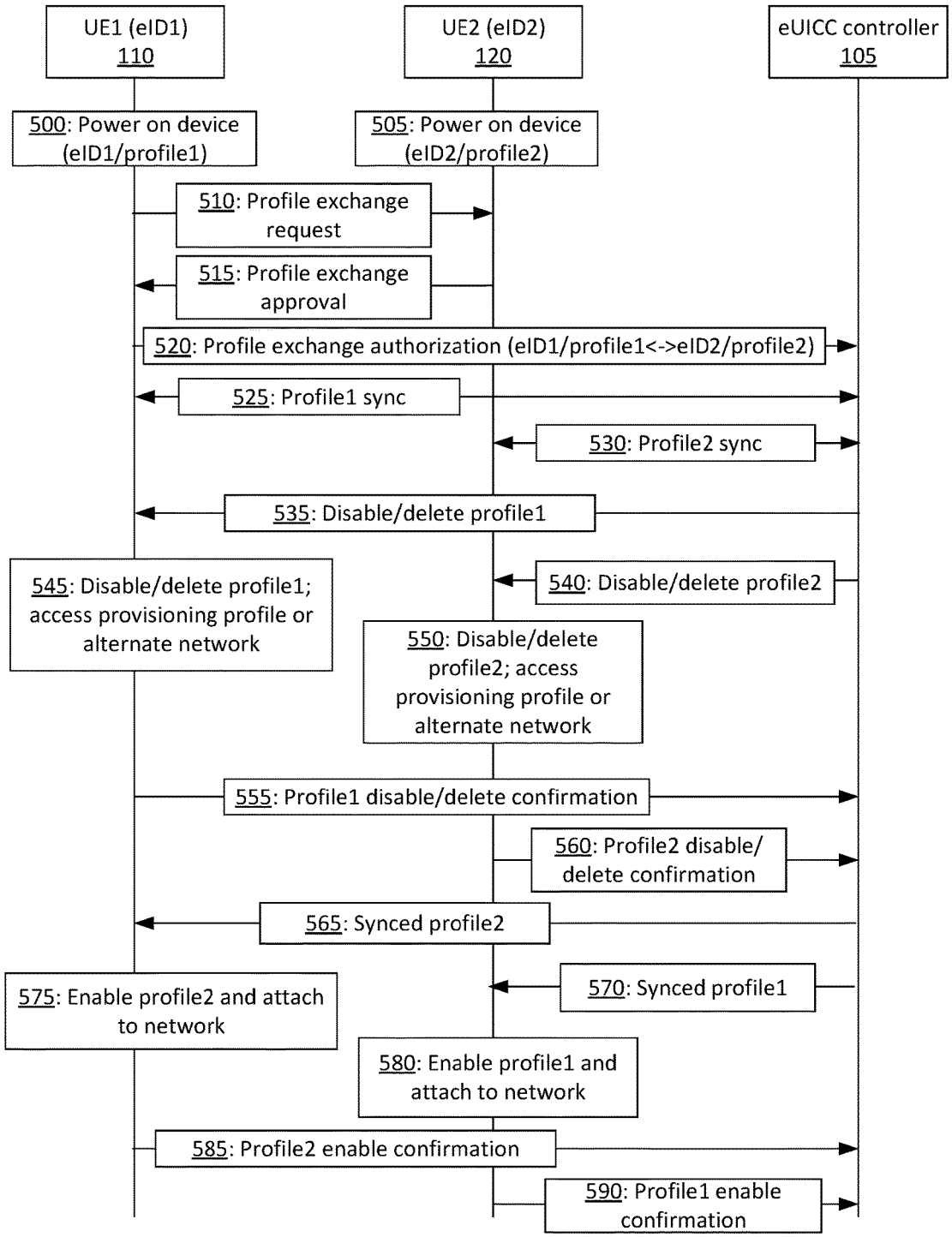
FIG. 5 illustrates the eUICC controller performing a profile exchange in accordance with some embodiments.

FIG. 5 illustrates eUICC controller 105 performing a profile exchange in accordance with some embodiments. The profile exchange may be used to swap profiles between first UE 110 and second UE 120.

First UE 110 may power (at 500) on, and attach to one or more available wireless networks using one or more wireless radios of first UE 110. Similarly, second UE 120 may power (at 505) on, and attach to one or more available wireless networks using one or more wireless radios of second UE 120.

First UE 110 may initiate the profile exchange by issuing (at 510) a profile exchange request to second UE 120. Second UE 120 may respond by either approving or rejecting the request to exchange profiles with first UE 110. In this example, second UE 120 may issue (at 515) a message to first UE 110 approving the profile exchange. Second UE 120 may generate and include a security key with the profile exchange approval message. As described below, the security key may allow second UE 120 to verify that profile exchange commands from eUICC controller 105 are for an approved profile exchange. In response to the approval by second UE 120, first UE 110 may provide (at 520) a profile exchange authorization message to eUICC controller 105.

In some embodiments, Short Messaging Service ("SMS") messages may be used to issue (at 510) the profile exchange request, issue (at 515) the profile exchange approval message, and/or issue (at 520) the profile exchange authorization message. A secure form of SMS messaging may be used to exchange the messages. For instance, first UE 110 may issue (at 510) the profile exchange request to a secure messaging server of network 130. The secure messaging server may forward the request on behalf of first UE 110 to second UE 120. Second UE 120 may respond by providing approval or rejection for the profile exchange via a second SMS message to the secure messaging server. In response to second UE 120 approving the profile exchange request first UE 110, secure messaging server may issue the profile exchange authorization message on behalf of first UE 110 to eUICC controller 105.

Other communications or messages can be used for initiating the profile exchange. For example, secure (e.g., encrypted) or unsecure IP data packets may be issued between first UE 110, second UE 120, and/or eUICC controller 105. The data packets may be exchanged over different networks. For example, data packets may be directly exchanged between first UE 110 and second UE 120 via Bluetooth, WiFi direct, Near Field Communication ("NFC"), or other connectivity established between the devices. Data packets may also be exchanged between the devices over different RANs of different wireless telecommunication networks (e.g., network 130), WiFi networks, Local Area Networks ("LANs"), or other data networks (e.g., the Internet).

The profile exchange authorization message, provided (at 520) by first UE 110 to eUICC controller 105, may include one or more keys for securing the exchange. A first key may be generated by first UE 110. A second key may be generated by second UE 120, and may be provided to first UE 110 as part of issuing (at 515) the profile exchange approval message. eUICC controller 105 may include the keys as part of any profile exchanging messaging that is sent to first UE 110 or second UE 120 (e.g., profile synchronization, disable and/or delete command, etc.), so that first UE 110 and second UE 120 can verify that the profile exchanging messaging is for an approved or authorized exchange. In other words, the keys may prevent a profile exchange when one of the two UEs has not approved the profile exchange.

The profile exchange authorization message may also include a first eID and/or ICCID associated with a first target profile stored by the eUICC of first UE 110, and a second eID and/or ICCID associated with a second target profile stored by the eUICC of second UE 120, wherein the target profiles are the profiles that are to be exchanged. In some embodiments, the profile exchange request may include the unique identifiers (e.g., telephone numbers) associated with first UE 110 and second UE 120, and eUICC controller 105 may determine the eIDs and/or ICCIDs for the target profiles based on the unique identifiers.

eUICC controller 105 may synchronize (at 525) a first profile that is stored by the eUICC of first UE 110, and may synchronize (at 530) a second profile that is stored by the eUICC of second UE 120 in response to the UEs 110 and 120 providing confirmation for a profile exchange via the profile exchange authorization message. The synchronization (at 525 and 530) may include obtaining a complete copy of the profile stored by each eUICC, or updating a base profile that is provisioned to each UE (e.g., first UE 110 and second UE 120) with a subset of customized parameters that eUICC controller 105 synchronizes from the profile stored by each device's eUICC.

In response to synchronizing (at 525) the profile of first UE 110, eUICC controller 105 may provide (at 535) a disable and/or delete command targeting the synchronized first profile to first UE 110. First UE 110 may disable and/or delete (at 545) the first profile, and provide (at 555) confirmation of the disabled and/or deleted first profile to eUICC controller 105. First UE 110 may access wireless network service from an alternate network, or may obtain limited profile provisioning access from network 130 via a provisioning profile that remains on the first UE 110 eUICC.

Similarly, eUICC controller 105 may provide (at 540) a disable and/or delete command targeting the synchronized second profile to second UE 110. Second UE 110 may disable and/or delete (at 550) the second profile, provide (at 560) confirmation of the disabled and/or deleted second profile, and may access wireless network service from an alternate network, or obtain limited profile provisioning access from network 130.

eUICC controller 105 may provide (at 565) the first profile, synchronized (at 525) from the eUICC of first UE 110, to the eUICC of second UE 120. eUICC controller 105 may provide (at 570) the second profile, synchronized (at 530) from the eUICC of second UE 120, to the eUICC of first UE 110.

First UE 110 may enable (at 575) the second profile, and perform an activation procedure with network 130 based on the enabled (at 575) second profile. If activation is successful, first UE 110 may access wireless network services provided by network 130 according to the parameters of the second profile using the same unique identifier and account as previously used by second UE 120. First UE 110 may also provide (at 585) a profile enable confirmation message to eUICC controller 105 to signal successful activation.

Similarly, second UE 120 may enable (at 580) the first profile, perform an activation procedure with network 130 based on the enabled (at 580) first profile, and access wireless network services provided by network 130 according to the parameters of the first profile using the same unique identifier and account as previously used by first UE 110, if activation is successful. Second UE 120 may signal successful activation by providing (at 590) a profile enable confirmation message to eUICC controller 105.

Figure 6:
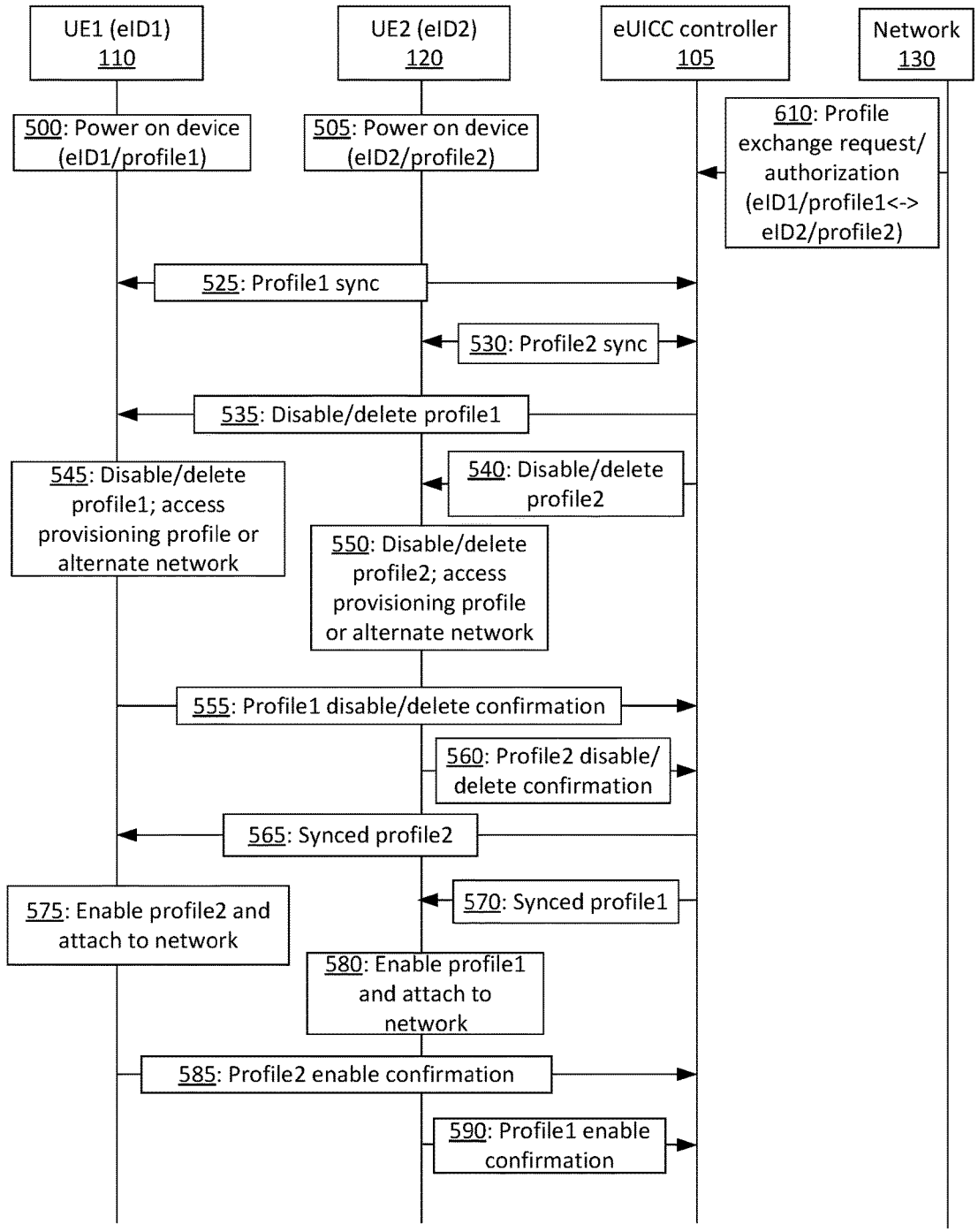
FIG. 6 illustrates an example of a network-initiated profile exchange.

FIG. 6 illustrates an example of network 130 initiating a profile exchange that is performed by eUICC controller 105. Network 130 may initiate the profile exchange when UEs of network 130 (e.g., first UE 110 and second UE 120) may be unable to communicate directly with eUICC controller 105. For instance, a third-party service provider may operate eUICC controller 105, and may provide the corresponding profile transfer functionality independently of network 130. Accordingly, network 130 may provide (at 610) the profile exchange request or authorization message to eUICC controller 105. Network 130 may provide (at 610) the message in response to first UE 110 and second UE 110 requesting and approving the profile exchange between them, or in response to a network-initiated action or event.

eUICC controller 105 may exchange profiles in response to receiving (at 610) the message, and first UE 110 and second UE 120 being powered (at 500 and 505) on and connected to at least one network. Here again, the profile exchange may including synchronizing (at 525 and 530) the profiles from the source UEs (e.g., a first profile present on the eUICC of first UE 110, and a second profile present on the eUICC of second UE 120), disabling and/or deleting (at 535, 540, 545, and 550) the synchronized profiles from the eUICC of the source UEs, receiving (at 555 and 560) confirmation regarding the disabled and/or deleted profiles, providing the synchronized profiles to the destination UEs (e.g., the first profile to the eUICC of second UE 120, and the second profile to eUICC of first UE 110), enabling (at 575 and 580) the newly download profiles, and providing (at 585 and 590) confirmation in response to enabling the profiles on the destination UEs.

Figure 7:
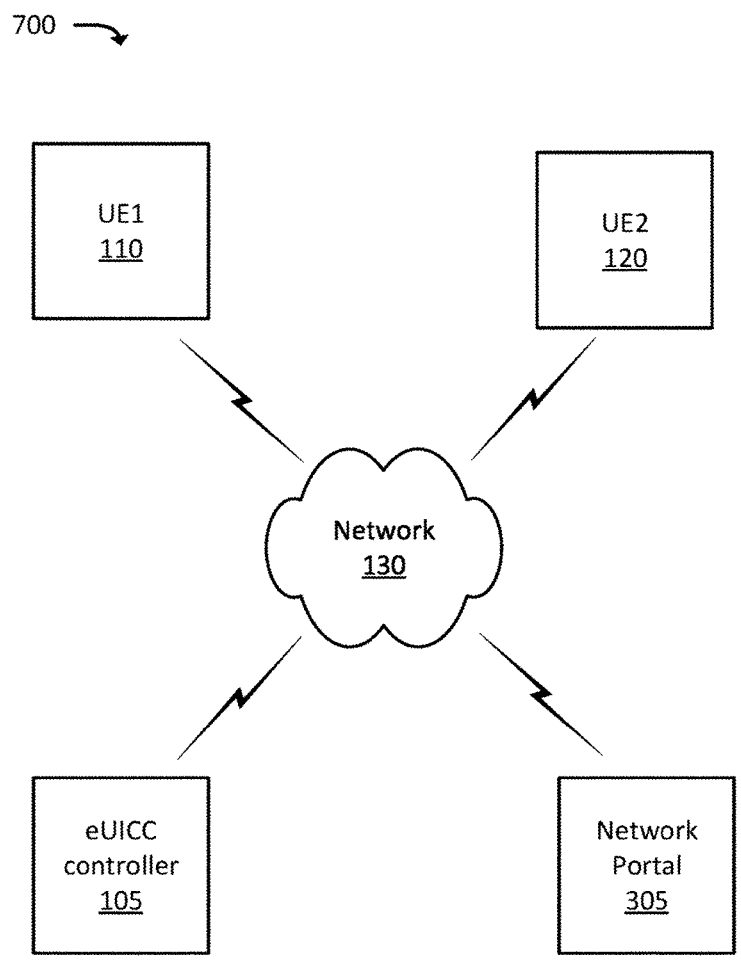
FIG. 7 illustrates an example environment, in which one or more embodiments, described herein, may be implemented.

FIG. 7 illustrates an example environment 700, in which one or more embodiments, described herein, may be implemented. As shown in FIG. 7, environment 700 may include first UE 110, second UE 120, eUICC controller 105, network portal 305, and network 130. The quantity of devices and/or networks, illustrated in FIG. 7, is provided for explanatory purposes only. In practice, environment 700 may include additional devices and/or networks; fewer devices and/or networks; different devices and/or networks; or differently arranged devices and/or networks than illustrated in FIG. 7. For example, while not shown, environment 700 may include devices that facilitate or enable communication between various components shown in environment 700, such as RANs, WiFi networks, direct device-to-device connectivity via Bluetooth, WiFi direct, NFC, or other network technology, network 130 core components (e.g., Serving Gateway, Packet Data Network ("PDN") Gateway, Mobile Management Entity, SM-DP server, etc.), routers, gateways, etc. Alternatively, or additionally, one or more of the devices of environment 700 may perform one or more functions described as being performed by another one or more of the devices of environments 700. Devices of environment 700 may interconnect with each other and/or other devices via wired connections, wireless connections, or a combination of wired and wireless connections. In some implementations, one or more devices of environment 700 may be physically integrated in, and/or may be physically attached to, one or more other devices of environment 700.

First UE 110 and second UE 120 may each include any computation and communication device that is capable of communicating with one or more networks (e.g., network 130). For example, first UE 110 may include a device that can access voice or calling services provided by network 130, and/or receive content, such as web pages (e.g., that include text content and/or image content), streaming audio and/or video content, and/or other content, via an Internet connection, data services provided by network 130, and/or via some other delivery technique. In some implementations, first UE 110 and second UE 120 may be or may include a radiotelephone, a personal communications system ("PCS") terminal (e.g., a device that combines a cellular radiotelephone with data processing and data communications capabilities), a personal digital assistant ("PDA") (e.g., a device that includes a radiotelephone, a pager, etc.), a smart phone, a laptop computer, a tablet computer, a vehicle (e.g., automobile), a telematics equipped device or terminal, a television, a personal gaming system, a wearable device, and/or another type of computation and communication device.

eUICC controller 105 may include, be implemented as part of, and/or be communicatively coupled with, an enhanced remote SIM provisioning ("RSP") device for transferring (e.g., moving or exchanging) profiles between eUICCs of different UEs according to the embodiments described herein. eUICC controller 105 may be operated by network 130 as part of, or in conjunction with, an internal RSP platform or OTA SIM provisioning platform. eUICC controller 105 may also be operated independently by a third-party service provider.

Network portal 305 may provide an interface for subscribers to access network 130 account information and/or manage the account information. The interface may include a front-end application that executes on a UE, or a website that is via a browser executing on the UE. Network portal 305 front-end may communicate with network portal 305 back-end. The back-end may be located in or as part of network 130. For instance, network portal 305 back-end may access subscriber account information from the HSS of network 130.

Network 130 may include one or more RANs, via which UEs may access one or more other networks or devices, a core network of a wireless telecommunications network, an IP-based PDN, a wide area network ("WAN") such as the Internet, a private enterprise network, and/or one or more other networks. In some implementations, network 130 may be, or include, a cellular network, such as a Long-Term Evolution ("LTE") network, a Third Generation ("3G") network, a Fourth Generation ("4G") network, a Fifth Generation ("5G") network, a Code Division Multiple Access ("CDMA") network, etc. UEs may connect, via network 130, to data servers, application servers, other UEs, other networks, etc. Network 130 may be connected to one or more other networks, such as a public switched telephone network ("PSTN"), a PLMN, and/or another network.

Figure 8:
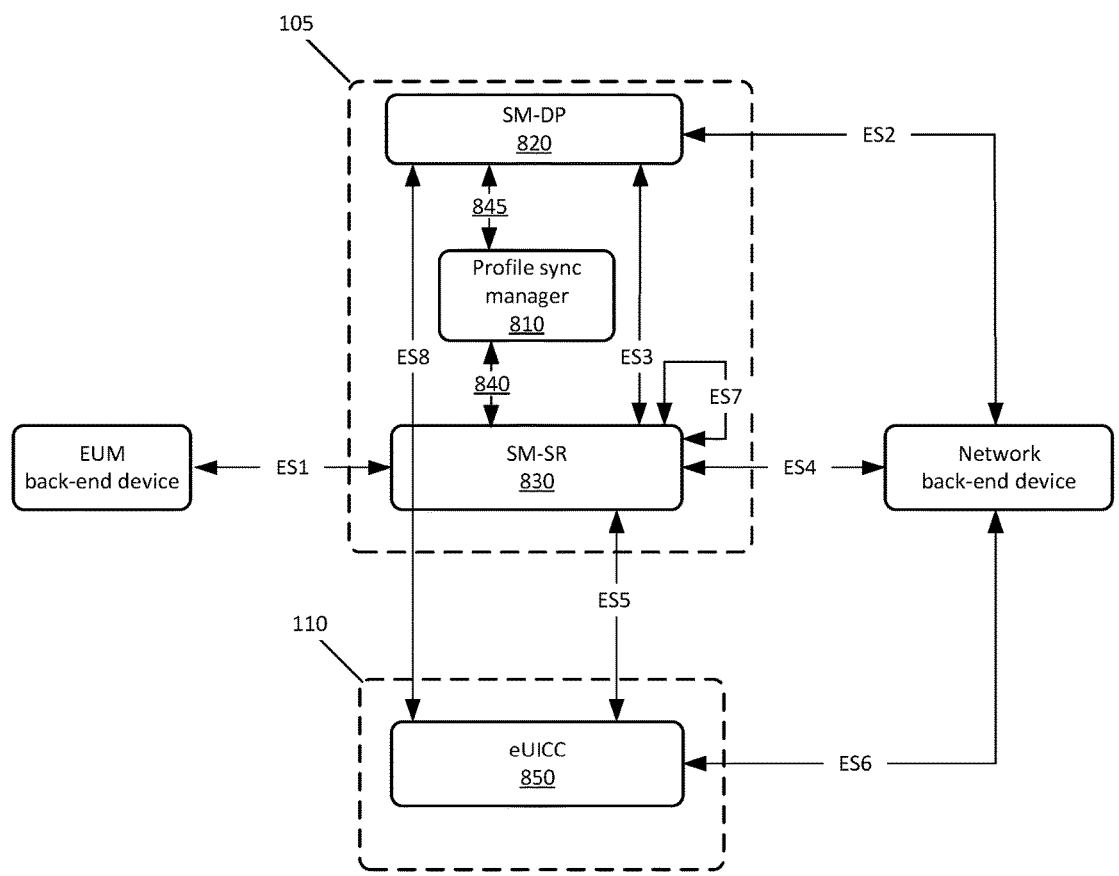
FIG. 8 illustrates example components of the eUICC controller according to an implementation described herein.

FIG. 8 illustrates example components of eUICC controller 105 according to an implementation described herein. As shown, eUICC controller 105 may include profile synchronization manager 810, SM-DP component 820, Subscription Manager Securing Routing ("SM-SW") component 830, interface 840 communicably coupling profile synchronization manager 810 to SM-SR component 830, and interface 845 communicably coupling profile synchronization manager 810 to SM-DP component 820.

eUICC profile synchronization may be handled by profile synchronization manager 810. Profile synchronization manager 810 may be configured with a set of "ProfileSynchronization" commands that eUICC 850 of a UE executes. For instance, the ProfileSynchronization commands may cause eUICC 850 to read out entire profile contents or specific parameters from a stored profile, and to return the read data back to profile synchronization manager 810. Each ProfileSynchronization command may specify the ICCID of a target profile and one or more parameters of the target profile.

SM-SR 830 provides the ES5 interface to eUICC 850. The ES5 interface may be a secure channel that is established between SM-SR 830 and eUICC 850. SM-SR 830 may provide ProfileSynchronization commands from profile synchronization manager 810 to eUICC 850 via the ES5 interface.

SM-DP 820 may manage the base profiles that are initially provisioned to eUICC 850, and may obtain the synchronized profiles from profile synchronization manager 810 via interface 845. SM-DP 820 may manage the downloading of the synchronized profiles from profile synchronization manager 810. SM-DP 820 may also be tasked with issuing the profile disable and/or delete commands, updating the subset of customized parameters during profile activation, and providing other messaging or commands and other functions).

In some embodiments, SM-DP 820 may communicate with eUICC 850 via the ES8 interface. The ES8 interface may include a secure channel that is tunneled through an ES3 interface established between SM-SR 830 and SM-DP 820, and the ES5 interface established between SM-SR 830 and eUICC 850.

eUICC controller 105 may also include interfaces ES1, ES2, ES4, and ES7. The ES1 interface may be an interface between SM-SR 830 and an eUICC manufacturer ("EUM"). SM-SR 830 may use the ES1 interface to obtain key sets for profile downloading, synchronization, and installation. The EUM may also use the ES1 interface to register an eUICC represented by its eUICC Information Set ("EIS") with eUICC controller 105.

The ES2 interface may be established between SM-DP 820 and network 130. The ES2 interface facilitates communications between eUICC controller 105 and network 130. For instance, network 130 may use the ES2 interface to initiate, from eUICC controller 105, the transfer or downloading of a profile to eUICC 850, the updating of eUICC 850 profile parameters, enabling, disabling, deleting, and/or activating of a profile on eUICC 850. eUICC controller 105 may use the ES2 interface to provide to network 130, confirmation or status about a profile download, profile transfer, disabled or deleted profile, enabled profile, or other operation that eUICC controller 105 performs based on instruction from network 130.

The ES4 interface may be established between SM-SR 830 and network 130. The ES4 interface may be used by SM-SR 830 to obtain base profiles from network 130. The ES4 interface may also be used by network 130 to initiate, from eUICC controller 105, the updating of eUICC 850 profile parameters, enabling, disabling, deleting, and/or activating of a profile on eUICC 850.

The ES7 interface may enable SM-SR 830 to request a new key set to be created in eUICC 850. The ES7 interface may also be used to request handover management of eUICC 850 (e.g., represented by its EIS), authenticate SM-SR 830 to eUICC 850, and perform other functions.

The ES6 interface may allow network 130 to directly communicate with eUICC 850 for various internal eUICC OTA management. For instance, network 130 may directly update a profile on eUICC 850 as part of an eUICC activation or registration procedure.

Figure 9:
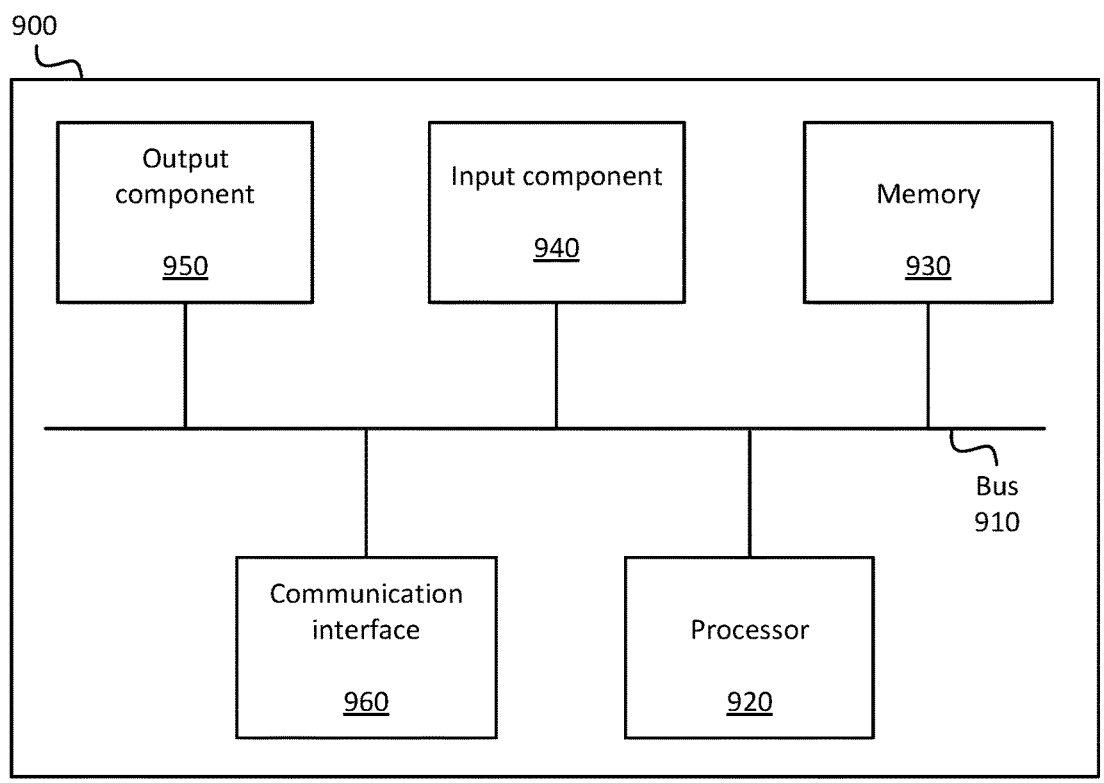
FIG. 9 illustrates example components of one or more devices, according to one or more embodiments described herein.

FIG. 9 is a diagram of example components of device 900. Device 900 may be used to implement certain of the devices described above (e.g., eUICC controller 105, first UE 110, and second 120). Device 900 may include bus 910, processor 920, memory 930, input component 940, output component 950, and communication interface 960. In another implementation, device 900 may include additional, fewer, different, or differently arranged components.

Bus 910 may include one or more communication paths that permit communication among the components of device 900. Processor 920 may include a processor, microprocessor, or processing logic that may interpret and execute instructions. Memory 930 may include any type of dynamic storage device that may store information and instructions for execution by processor 920, and/or any type of non-volatile storage device that may store information for use by processor 920.

Input component 940 may include a mechanism that permits an operator to input information to device 900, such as a keyboard, a keypad, a button, a switch, etc. Output component 950 may include a mechanism that outputs information to the operator, such as a display, a speaker, one or more light emitting diodes ("LEDs"), etc.

Communication interface 960 may include any transceiver-like mechanism that enables device 900 to communicate with other devices and/or systems. For example, communication interface 960 may include an Ethernet interface, an optical interface, a coaxial interface, or the like. Communication interface 960 may include a wireless communication device, such as an infrared ("IR") receiver, a Bluetooth® radio, or the like. The wireless communication device may be coupled to an external device, such as a remote control, a wireless keyboard, a mobile telephone, etc. In some embodiments, device 900 may include more than one communication interface 960. For instance, device 900 may include an optical interface and an Ethernet interface.

Device 900 may perform certain operations relating to one or more processes described above. Device 900 may perform these operations in response to processor 920 executing software instructions stored in a computer-readable medium, such as memory 930. A computer-readable medium may be defined as a non-transitory memory device. A memory device may include space within a single physical memory device or spread across multiple physical memory devices. The software instructions may be read into memory 930 from another computer-readable medium or from another device. The software instructions stored in memory 930 may cause processor 920 to perform processes described herein. Alternatively, hardwired circuitry may be used in place of or in combination with software instructions to implement processes described herein. Thus, implementations described herein are not limited to any specific combination of hardware circuitry and software.

The foregoing description of implementations provides illustration and description, but is not intended to be exhaustive or to limit the possible implementations to the precise form disclosed. Modifications and variations are possible in light of the above disclosure or may be acquired from practice of the implementations.

For example, the pull profile transfer request of FIG. 3 may be combined with the base/custom profile reconstruction of FIG. 4. As another example, the exchange request/approval shown in FIG. 5 may be used in lieu of, or in addition to, the authentication process shown in FIG. 3 (e.g., the UEs may agree to exchange profiles by tapping via NFC, without accessing network portal 305 or obtaining account information from network portal 305). As another example, the profile move of FIG. 3 and the profile exchange of FIG. 5 may be performed to move or port service from network 130 to another network.

The actual software code or specialized control hardware used to implement an embodiment is not limiting of the embodiment. Thus, the operation and behavior of the embodiment has been described without reference to the specific software code, it being understood that software and control hardware may be designed based on the description herein.

For example, while series of blocks and/or signals have been described with regard to FIGS. 1-6, the order of the blocks and/or signals may be modified in other implementations. Further, non-dependent blocks and/or signals may be performed in parallel. Additionally, while the figures have been described in the context of particular devices performing particular acts, in practice, one or more other devices may perform some or all of these acts in lieu of, or in addition to, the above-mentioned devices.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

Further, while certain connections or devices are shown, in practice, additional, fewer, or different, connections or devices may be used. Furthermore, while various devices and networks are shown separately, in practice, the functionality of multiple devices may be performed by a single device, or the functionality of one device may be performed by multiple devices. Further, multiple ones of the illustrated networks may be included in a single network, or a particular network may include multiple networks. Further, while some devices are shown as communicating with a network, some such devices may be incorporated, in whole or in part, as a part of the network.

To the extent the aforementioned embodiments collect, store or employ personal information provided by individuals, it should be understood that such information shall be used in accordance with all applicable laws concerning protection of personal information. Additionally, the collection, storage and use of such information may be subject to consent of the individual to such activity, for example, through well-known "opt-in" or "opt-out" processes as may be appropriate for the situation and type of information. Storage and use of personal information may be in an appropriately secure manner reflective of the type of information, for example, through various encryption and anonymization techniques for particularly sensitive information.

Some implementations described herein may be described in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or al to" (or similar terms). As used herein, "exceeding" a threshold (or similar terms) may be used interchangeably with "being greater than a threshold," "being greater than or equal to a threshold," "being less than a threshold," "being less than or equal to a threshold," or other similar terms, depending on the context in which the threshold is used.

No element, act, or instruction used in the present application should be construed as critical or essential unless explicitly described as such. An instance of the use of the term "and," as used herein, does not necessarily preclude the interpretation that the phrase "and/or" was intended in that instance. Similarly, an instance of the use of the term "or," as used herein, does not necessarily preclude the interpretation that the phrase "and/or" was intended in that instance. Also, as used herein, the article "a" is intended to include one or more items, and may be used interchangeably with the phrase "one or more." Where only one item is intended, the terms "one," "single," "only," or similar language is used. Further, the phrase "based on" is intended to mean "based, at least in part, on" unless explicitly stated otherwise.

What is claimed is:

1. A device comprising:
   a non-transitory computer-readable medium storing a set of processor-executable instructions; and
   one or more processors configured to execute the set of processor-executable instructions, wherein executing the set of processor-executable instructions causes the one or more processors to:
   obtain a first Subscriber Identity Module ("SIM") profile comprising a plurality of parameters;
   access a first embedded Universal Integrated Circuit Card ("eUICC") of a first User Equipment ("UE") via a wireless network connection to the first UE, the first eUICC comprising a second SIM profile;
   determine, via the access to the first eUICC, one or more customizations made to a set of parameters of the second SIM profile based on the device using the second SIM profile to access a wireless telecommunications network;
   generate a synchronized first SIM profile by modifying one or more of the plurality of parameters of the first SIM profile according to the one or more customizations made to the set of parameters of the second SIM profile; and
   provide the synchronized first SIM profile to a second eUICC of a second UE, wherein providing the synchronized first SIM profile to the second eUICC allows the second UE to access the wireless telecommunications network using an account associated with the first SIM profile.

2. The device of claim 1, wherein the processor-executable instructions further include processor-executable instructions to:
receive a profile transfer request that includes one or more of a unique identifier associated with the first UE or an eUICC-identifier ("eID") associated with the first eUICC; and
issue a profile synchronization request to the first UE based on the unique identifier or the eID from the profile transfer request.

3. The device of claim 1, wherein the processor-executable instructions further include processor-executable instructions to:
receive a profile transfer request comprising an Integrated Circuit Card Identifier ("ICCID");
determine that the ICCID is associated with the second SIM profile, wherein the first eUICC stores the second SIM profile and at least one other SIM profile associated with a different ICCID; and
synchronize the first SIM profile with the second SIM profile based on the ICCID of the profile transfer request.

4. The device of claim 1, wherein the processor-executable instructions further include processor-executable instructions to:
provide a profile disable or delete command to the first UE in response to generating the synchronized first SIM profile.

5. The device of claim 4, wherein the processor-executable instructions further include processor-executable instructions to:
receive a message from the first UE confirming disabling or deletion of the second SIM profile from the first eUICC; and
initiate a download of the synchronized first SIM profile to the second eUICC in response to receiving the message.

6. The device of claim 1, wherein the processor-executable instructions further include processor-executable instructions to:
provide a profile synchronization request to the first UE, the profile synchronization request comprising an ICCID of the second SIM profile stored by the first eUICC.

7. The device of claim 1, wherein the processor-executable instructions further include processor-executable instructions to:
swap SIM profiles between the first eUICC and the second eUICC, wherein the swapping comprises:
generate a synchronized third SIM profile based on a third SIM profile that is stored by the second eUICC prior to providing the synchronized first SIM profile to the second eUICC; and
provide the synchronized third SIM profile to the first eUICC of the first UE in response to disabling or deleting the third SIM profile from the second eUICC.

8. The device of claim 1, wherein the processor-executable instructions further include processor-executable instructions to:
establish a first secure connection to the first eUICC and a second secure connection to the second eUICC,
wherein the processor-executable instructions to determine the set of parameters further include processor-executable instructions to obtain the one or more customizations made to the set of parameters from the first eUICC via the first secure connection, and
wherein the processor-executable instructions to provide the synchronized first SIM profile further include processor-executable instructions to download the synchronized first SIM profile to the second eUICC via the second secure connection.

9. The device of claim 1, wherein the processor-executable instructions further include processor-executable instructions to:
transfer wireless network service access via the account associated with the first SIM profile from the first UE to the second UE in response to providing the synchronized first SIM profile to the second eUICC.

10. A non-transitory computer-readable medium, storing a set of processor-executable instructions, which, when executed by one or more processors, cause the one or more processors to:
obtain a first Subscriber Identity Module ("SIM") profile comprising a plurality of parameters;
access a first embedded Universal Integrated Circuit Card ("eUICC") of a first User Equipment ("UE") via a wireless network connection to the first UE, the first eUICC comprising a second SIM profile;
determine, via the access to the first eUICC, one or more customizations made to a set of parameters of the second SIM profile based on the device using the second SIM profile to access a wireless telecommunications network;
generate a synchronized first SIM profile by modifying one or more of the plurality of parameters of the first SIM profile according to the one or more customizations made to the set of parameters of the second SIM profile; and
provide the synchronized first SIM profile to a second eUICC of a second UE, wherein providing the synchronized first SIM profile to the second eUICC allows the second UE to access the wireless telecommunications network using an account associated with the first SIM profile.

11. The non-transitory computer-readable medium of claim 10, wherein the processor-executable instructions further include processor-executable instructions to:
receive a profile transfer request that includes one or more of a unique identifier associated with the first UE or an eUICC-identifier ("eID") associated with the first eUICC; and
issue a profile synchronization request to the first UE based on the unique number or the eID from the profile transfer request.

12. The non-transitory computer-readable medium of claim 10, wherein the processor-executable instructions further include processor-executable instructions to:
receive a profile transfer request comprising an Integrated Circuit Card Identifier ("ICCID");
determine that the ICCID is associated with the second SIM profile, wherein the first eUICC stores the second SIM profile and at least one other SIM profile associated with a different ICCID; and
synchronize the first SIM profile with the second SIM profile based on the ICCID of the profile transfer request.

13. The non-transitory computer-readable medium of claim 10, wherein the processor-executable instructions further include processor-executable instructions to:
provide a profile disable or delete command to the first UE in response to generating the synchronized first SIM profile.

14. The non-transitory computer-readable medium of claim 13, wherein the processor-executable instructions further include processor-executable instructions to:
receive a message from the first UE confirming disabling or deletion of the second SIM profile from the first eUICC; and
initiate a download of the synchronized first SIM profile to the second eUICC in response to receiving the message.

15. The non-transitory computer-readable medium of claim 13, wherein the processor-executable instructions further include processor-executable instructions to:
provide a profile synchronization request to the first UE, the profile synchronization request comprising an ICCID of the second SIM profile stored by the first eUICC.

16. A method comprising:
obtaining a first Subscriber Identity Module ("SIM") profile comprising a plurality of parameters;
accessing a first embedded Universal Integrated Circuit Card ("eUICC") of a first User Equipment ("UE") via a wireless network connection to the first UE, the first eUICC comprising a second SIM profile;
determining, via the access to the first eUICC, one or more customizations made to a set of parameters of the second SIM profile based on the device using the second SIM profile to access a wireless telecommunications network;
generating a synchronized first SIM profile by modifying one or more of the plurality of parameters of the first SIM profile according to the one or more customizations made to the set of parameters of the second SIM profile; and
providing the synchronized first SIM profile to a second eUICC of a second UE, wherein providing the synchronized first SIM profile to the second eUICC allows the second UE to access the wireless telecommunications network using an account associated with the first SIM profile.

17. The method of claim 16, further comprising:
receiving a profile transfer request that includes one or more of a unique identifier associated with the first UE or an eUICC-identifier ("eID") associated with the first eUICC; and
issuing a profile synchronization request to the first UE based on the unique identifier or the eID from the profile transfer request.

18. The method of claim 16, further comprising:
receiving a message from the first UE confirming disabling or deletion of the second SIM profile from the first eUICC; and
initiating a download of the synchronized first SIM profile to the second eUICC in response to receiving the message.

19. The method of claim 16, further comprising:
establishing a first secure connection to the first eUICC and a second secure connection to the second eUICC,
wherein determining comprises obtaining the one or more customizations made to the set of parameters from the first eUICC via the first secure connection, and
wherein providing comprises downloading the synchronized first SIM profile to the second eUICC via the second secure connection.

20. The method of claim 16, further comprising:
transferring wireless network service access via the account associated with the first SIM profile from the first UE to the second UE in response to providing the synchronized first SIM profile to the second eUICC.

* * * * *